United States Patent [19]

Tagami et al.

[11] Patent Number: 4,535,334
[45] Date of Patent: Aug. 13, 1985

[54] APPARATUS FOR VISUALLY INDICATING THE TRAVEL ROUTE OF AN AUTOMOTIVE VEHICLE

[75] Inventors: Katsutoshi Tagami; Tsuneo Takahashi, both of Saitama; Shinichiro Yasui, Tokyo; Akira Ichikawa, Saitama, all of Japan

[73] Assignee: Honda Giken Kogyo Kabushiki Kaisha, Tokyo, Japan

[21] Appl. No.: 384,919

[22] Filed: Jun. 4, 1982

[30] Foreign Application Priority Data

Jun. 4, 1981 [JP] Japan .................................. 56-86135

[51] Int. Cl.³ .......................... G08G 1/12; G08B 1/00
[52] U.S. Cl. ................... 340/995; 307/10 R; 315/360; 340/309.15; 340/988
[58] Field of Search ...................... 340/23, 24, 309.15, 340/995, 988; 315/83, 82, 360; 364/707, 460, 443; 307/10 R

[56] References Cited

U.S. PATENT DOCUMENTS

| | | | |
|---|---|---|---|
| 3,225,250 | 12/1965 | Hershberger | 315/360 |
| 4,024,493 | 5/1977 | Ingels | 340/23 |
| 4,122,371 | 10/1978 | Talmage | 315/360 |
| 4,222,028 | 9/1980 | Danchilla | 340/309.15 |
| 4,271,402 | 6/1981 | Kastura | 307/10 R |
| 4,402,050 | 8/1983 | Tagami | 340/996 |

Primary Examiner—James J. Groody
Attorney, Agent, or Firm—Irving M. Weiner; Pamela S. Burt

[57] ABSTRACT

A travel route indicating apparatus for use in an automotive vehicle, wherein a current travel route of the automotive vehicle in terms of two-dimensional coordinates may be obtained arithmetically by means of signal processing on the basis of the outputs from a travel distance detecting unit adapted to detect a current travel distance of the vehicle, and from a bearing detecting unit adapted to detect a resultant azimuth taken by the vehicle after travelling to a current point of travel, so that the thus obtained locational data on the location of the vehicle varying from time to time may be stored in sequence, and so that the travel path of the vehicle may be continuously visually indicated, as the vehicle travels, on the screen of a display from the thus-obtained travel data leading to the resulting current location of the vehicle. The apparatus comprises, in operative combination, a power supply control circuit adapted to detect the opening status of an ignition key switch and then output a power conducting command for a predetermined period of time and a power supply circuit adapted to self-hold the power conducting status to the signal processing unit upon the receipt of the command when the ignition key switch is opened, while holding the thus-stored data in the signal processing unit for a predetermined period of time even after the ignition key switch is opened.

2 Claims, 3 Drawing Figures

APPARATUS FOR VISUALLY INDICATING THE TRAVEL ROUTE OF AN AUTOMOTIVE VEHICLE

BACKGROUND OF THE INVENTION

1. Field of the Invention

The present invention relates to a travel route indicating device for use in a vehicle, and more particularly to an improved apparatus for determining and visually indicating a current location, a travelling path and a current travel direction of an automotive vehicle to its driver.

2. Description of the Prior Art

In the attempt to prevent the driver of an automotive vehicle or the like from losing his way when driving such as at night or in unfamiliar surroundings away from his desired route of travel, there have been developed a variety of apparatus which are designed to visually indicate continuously or discretely a due current position or the like information on the vehicle by way of an indication panel or display screen including a related road map or the like disposed at the driver's seat so that he may be provided with necessary ready guidance relating to the vehicle's current status of travelling with respect to a desired course of travel.

In the conventional travel route indicating apparatus for such an application, a current travel distance of a vehicle is detected in accordance with its travel speed and time by using a distance detecting section, a current bearing and a current quantity of azimuthal deviation of the vehicle are detected by a bearing detecting section which employs a rate gyroscope or the like adapted to detect a possible angular velocity produced about the axis of yawing motion of the vehicle, a current location of the vehicle along its travel route is obtained from an arithmetic operation on the thus-obtained data, and the results of this arithmetic operation are stored in sequence, and indicated visually by way of spot information varying from time to time on a display screen upon which there is presented a transparent road map of routes or roads along which the vehicle travel.

With the conventional construction as described above, however, it is generally arranged in practice that the power supply to such travel route indicating apparatus is interlocked with the opening and closing operation of the ignition key switch of the vehicle. In this connection, therefore, there may be frequent possibilities of shut-offs of the power supply to the apparatus such as when stopping the engine of the vehicle for gas or for a meal when travelling. Thus the data on the travel of the vehicle up to that point of stopping is missed due to the volatility of the memory of the apparatus.

The present invention is essentially directed toward overcoming such inconveniences as experienced in the conventional travel route indicating apparatus.

SUMMARY OF THE INVENTION

It is therefore a primary object of the present invention to provide an improved travel route indicating apparatus for use in an automotive vehicle which incorporates a self-holding capability of data on all the attitudes of the vehicle operation which have been stored and accumulated during the travel of the vehicle up to a last point of stopping, even when the power supply to the apparatus is shut off.

More specifically, it is a further object of the present invention to provide an improved travel route indicating apparatus for use in an automotive vehicle, which is arranged such that the record or data stored and accumulated on all the travelling paths up to a last point of stopping, where the power supply to the apparatus is shut off together with the engine ignition, may automatically be self-contained or held for a certain predetermined period of time after the shut-off of the power supply, whereby thus far accumulated travel data of the vehicle may be continuously recovered upon the resuming the power supply to the apparatus.

Furthermore, it is a still further object of the present invention to provide an improved travel route indicating apparatus for use in an automotive vehicle, which is arranged such that the self-holding of the accumulated data on the travelling paths up to a last point of stopping may be aborted after the lapse of a predetermined period of time after the shut off of the power supply to the apparatus and when the power supply to the apparatus is still not restored, whereby a possibility of overdischarge of the battery of the vehicle is prevented.

According to the present invention, there is provided, an improved travel route indicating apparatus for use in an automotive vehicle, wherein a current travel route of the automotive vehicle in terms of two-dimensional coordinates may be obtained arithmetically by means of signal processing means on the basis of the outputs from the travel distance detecting unit adapted to detect a current travel distance of the vehicle, and from the bearing detecting unit adapted to a resultant azimuth taken by the vehicle after travelling to a current point of travel, so that the thus obtained locational data on the location of the vehicle varying from time to time may be stored in sequence, and so that the travel path of the vehicle may be visually indicated, in continuation as the vehicle travels, on the screen of the display from the thus-obtained travel data leading to the resulting current location of the vehicle. The apparatus comprises, in operative combination, power supply control circuit means for detecting the opening status of an ignition key switch and outputting a power conducting command for a predetermined period of time, and power supply circuit means adapted to self-hold the power conducting status to the signal processing unit upon the receipt of the command when the ignition key switch is opened, while holding the thus-stored data in the signal processing unit for a predetermined period of time even after the ignition key switch is opened.

The above and further objects, advantages and details of the present invention will become more apparent from the following detailed description by way of a preferred embodiment of the invention, when read in conjunction with the accompanying drawings, in which like parts are desisgnated with like reference numerals.

DETAILED DESCRIPTION OF THE INVENTION

The present invention will now be described in detail by way of example and a preferred embodiment thereof in conjunction with the accompanying drawings.

Figure 1:
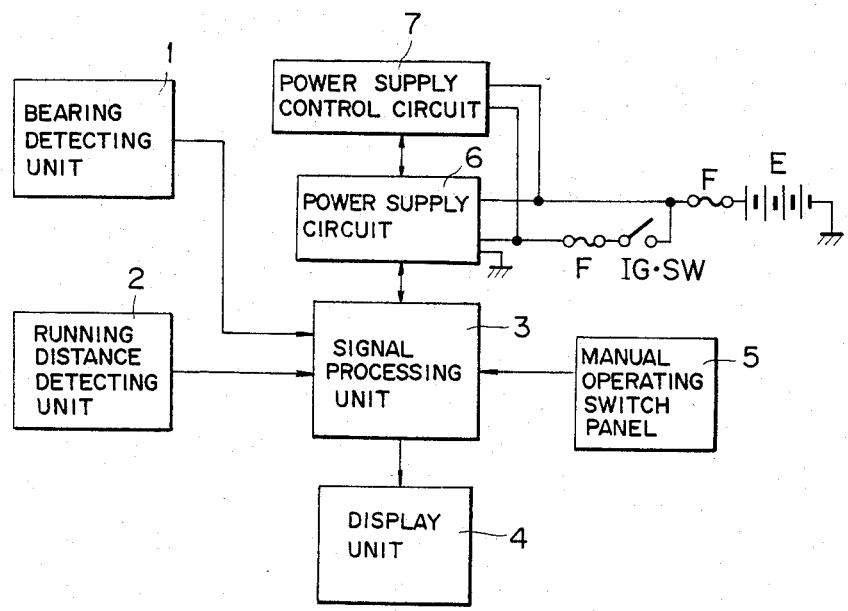
FIG. 1 is a schematic block diagram which shows the basic construction of the travel route indicating apparatus according to a preferred embodiment of the present invention.

Now, referring to FIG. 1, there is shown schematically the typical and basic construction of an improved travel route indicating apparatus for use in an automotive vehicle according to the present invention, which comprises, by way of a preferred embodiment thereof, a bearing detecting unit 1 adapted to output an electrical signal which is proportional to a current bearing or a current amount of azimuthal deviation of the vehicle in accordance with a current travel direction thereof. A travel distance detecting unit 2 is adapted to generate an electric signal corresponding to a current travel distance of the vehicle. A signal processing unit 3 is adapted to arithmetically obtain a current location of the vehicle in terms of two-dimensional coordinates for a unit travel distance of the vehicle in accordance with the outputs of the detecting units 1, 2, and store the thus-obtained data on the two-dimensional coordinates in reflection of the current travel path of the vehicle as being updated from time to time so as to hold the data as ready finite and continuous information on the locations of the vehicle corresponding to the travel path thereof, while centrally controlling the entire apparatus. A display unit 4 is adapted to visually indicate information as updated from time to time, such as a current travel direction, a current travel distance, and a time consumed up to the present point of the vehicle in accordance with the outputs from the signal processing unit 3. A manual operating switch panel 5 is adapted to give a command for indication on the display unit 4 to the signal processing unit 3, change the previous setting of the visual indication manner in the display unit 4 (such as change of the travel path, change of the given scale of indication on display, etc.) and adjust a current output sensitivity of the bearing detecting unit 1, as selectively desired. A power supply circuit 6 is provided and the battery source E is connected thereto through an ignition key switch IG·SW and a fuse F, and is interlocked to the switching operation of the ignition key switch IG·SW so as to be supplied with power in synchronism with the power supply thereto. A power supply control circuit 7 is adapted to detect the opening of the ignition key switch IG·SW so as to give a command for conducting the power supply circuit 6 for a predetermined period of time.

With such construction of the vehicle travel route indicating apparatus according to the present invention, it may advantageously operate as explained hereinafter in conjunction with the accompanying drawings.

In operation, before the start-up of the vehicle, a start-of-indication command is given to the indicating apparatus by way of the manual operating switch panel 5, and at the same time, a predetermined starting or reference point of the vehicle motion and a desired scale of indication are manually preset for the display unit 4 in accordance with the road map thereon through the manipulation of the operating switch panel 5, as desired. After such procedures, and when the vehicle starts traveling, a single electric pulse signal is sent at an interval of unit travel distance from the distance detecting unit 2 to the signal processing unit 3, where the number of pulses is counted so as to measure a current travel distance of the vehicle, while sending the output from the bearing detecting unit 1 out to the signal processing unit 3 concurrently, where a current travel direction or azimuth of the vehicle is determined at each moment as the vehicle travels. At the signal processing unit 3, there is arithmetically obtained a current location or graphic point (x, y) on the X-Y coordinates which varies from time to time as the vehicle continues travelling, with a predetermined scale of indication on the display unit 4, in accordance with the current travel distance and azimuthal deviation of the vehicle which were detected in the manner as described above, and the results of such arithmetic analysis are stored in sequence therein.

Figure 2:
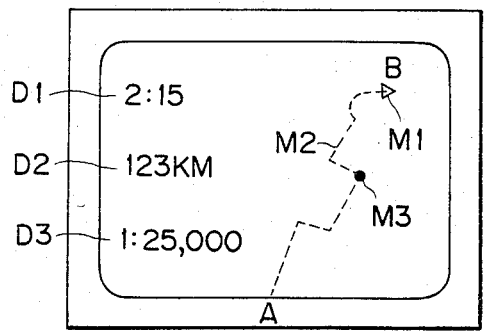
FIG. 2 is a schematic view showing a typical example of the visual indication provided by the travel route indicating apparatus of the invention.

The thus-stored content is constantly read out to be continuously fed into the display unit 4. At the same time, an azimuth signal in reflection of a current location of the vehicle is sequentially sent from the signal processing unit 3 to the display unit 4. More specifically, as typically shown in FIG. 2, such inputs to the display unit 4 in reflection of the current location of the vehicle are such that there appear a current location indicating mark M1 showing a current direction of the vehicle existing at a current location B thereof, and a path of travel indicating mark M2 showing the path of travel from the predetermined starting or reference point A over to the current location B of the vehicle in a simulation manner to follow the current travel route of the vehicle. In this display unit 4, as typically shown in FIG. 2, there may be indicated in accordance with the signals as fed from the signal processing unit 3 additional supplementary indication of, for instance, a total period of time D1 which is required for the vehicle to reach the current location B from the predetermined reference point (which is provided by using a suitable timer which is incorporated in the sianal processing unit 3, so as to function during the time period in which the vehicle travels), an indication of a current total mileage D2 up to the location B, or an indication of display scale D3 selected by using the manual operating switch panel 5, as desired.

In this manner, by referring to the current travel path taken up to the current location by the vehicle as visually indicated on the display unit 4 and the road representations on the map, it is possible for the driver of the vehicle to immediately judge along which route the vehicle is travelling from the visual indication on the display unit 4.

On the other hand, by virtue of the specific construction as practiced by way of the preferred embodiment of the invention, once the ignition key switch IG·SW is turned off for the purpose of stopping at a gas station or for a meal while travelling, this state of shut-off is duly detected by the power supply control circuit 7, whereupon a power supply command for a continued conducting to the signal processing unit 3 is fed from the power supply control circuit 7 to power supply circuit 6 long enough to hold the stored data in the signal processing unit 3 for a predetermined period of time 5 to 10 minutes, whereby the power supply circuit 6 continues to supply the power to the signal processing 3 for that period of time so that the stored data on the travel path of the vehicle may be held accordingly, and also causing an annunciator such as a buzzer to be operated for a short period of time (for example, 5 seconds) to apprise the driver of such effect.

With the above-described particular advantageous power supply maintenance according to the present invention, if the vehicle is restarted within that period of time, it is possible to immediately recover the continued display of the current travel path record on the screen of the display unit 4 in accordance with the stored data which is held and restored in the signal processing unit 3. Also, with the aid of warning from the annunciator, the driver of the vehicle may well note the effect that the signal processing unit 3 is now being supplied with the power, so that it is feasible to prevent a possible carelessness on the part of the driver in forgetting to shut off the main switch of the power when not in use.

Figure 3:
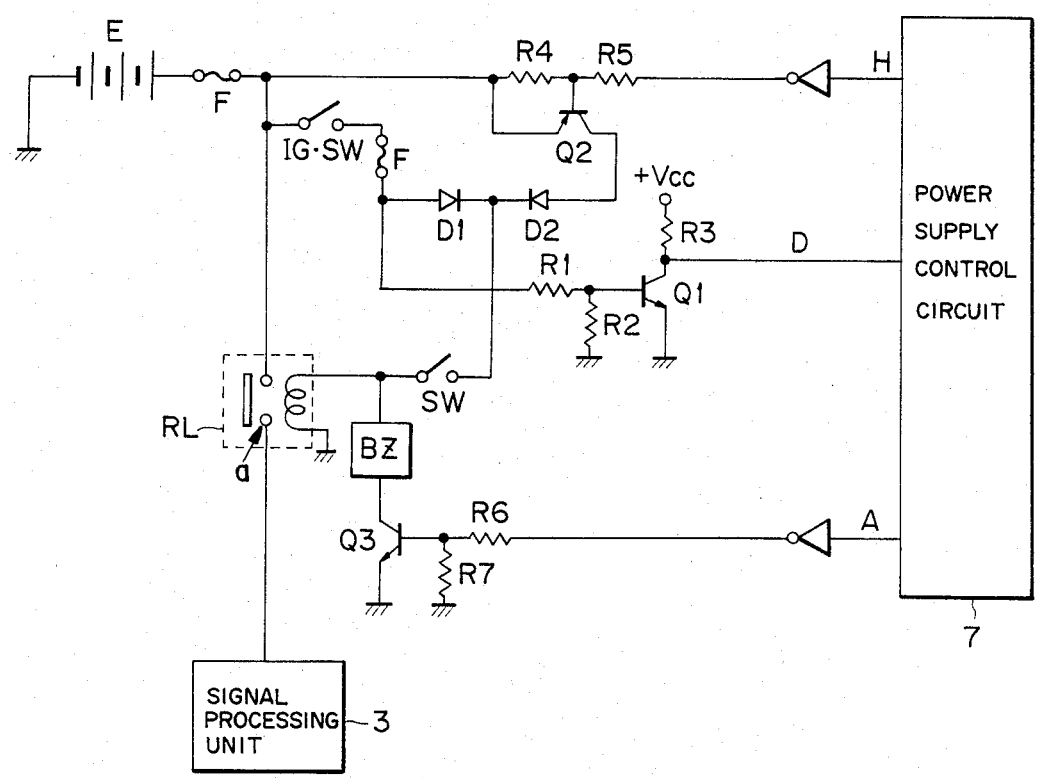
FIG. 3 is a schematic diagram which shows a typical example of the circuit construction of the power supply circuit according to the invention.

Now, referring to FIG. 3, which shows a circuit diagram of a typical example of power supply circuit 6, in which there are in circuit a relay RL which is designed to turn on and off the main circuit for connecting the battery E to the signal processing unit 3; a relay energizing circuit for energizing the coil of the above mentioned relay RL from the battery E through the ignition key switch IG·SW and the diode D1; a circuit for detecting the operating position of the ignition switch which comprises voltage dividing resistors R1, R2, a transistor Q1, and a resistor R3 for feeding a detection signal D as to whether the ignition key switch IG·SW is opened or not; a relay holding circuit which comprises resistors R4, R5, a transistor Q2 and a diode D2 for self-holding the above mentioned relay RL with a holding command H from the power supply control circuit 7; and a buzzer control circuit which comprises voltage dividing resistors R6, R7 and a transistor Q3 adapted for connecting the battery E to the buzzer BZ in accordance with a warning command A delivered from the power source circuit 7 upon the detection of the opening of the ignition switch IG·SW.

In this particular construction of the power supply circuit 6 according to the present invention, it is to be noted that when the vehicle is started-up (with the ignition key switch IG·SW being closed), the coil of the relay RL is energized through the relay energizing circuit, and the power is supplied from the battery E through the contact to the signal processing unit 3, which is now ready to perform such operations as the arithmetic operation of a current location of the vehicle and the storing of the results of such operation in sequence. Under such conditions, when the ignition key switch IG·SW is opened for a temporary parking of the vehicle, this state is then detected by the detecting circuit which comprises the transistor Q1 so as to produce a detection signal "O" (when the ignition key switch IG·SW is closed, producing a detection signal "O"), which signal is sent out to the power supply circuit 7, whereupon there is dispatched a storage holding signal H to the power supply circuit 6 for a predetermined period of time (5 to 10 minutes). The power supply circuit 6 now turns the transistor Q2 on in repsonse to that storage holding command H, thus completing the self-hold circuit for the relay RL, continuing to energize the relay RL, and thus continuing the power supply to the signal processing unit 3. At the same time, a warning command A is given to the power supply circuit 6 from the power supply control circuit 7 for a short predetermined period, whereupon power supply circuit 6 functions to turn on the transistor Q3 in the annunciator control circuit so as to operate the buzzer BZ for the short period.

In this connection, when the ignition key switch IG·SW is closed for restarting the vehicle within the predetermined period of time, the relay RL is directly energized through the relay energizing circuit, thus connecting the battery E to the signal processing unit 3 so that its heater is continuously fed with the supply for attaining the normal operation of the signal processing unit 3. In contrast, if the ignition key switch IG·SW is not closed within that predetermined period of time, then upon the lapse of such predetermined period, the self-holding circuit in the relay RL is opened, thereby stopping the power supply to the signal processing unit 3 from the battery E. There is provided a power switch SW in the self-holding circuit for the relay RL, which power switch can be designed so as to be closed when the relay RL is self-held for the short time parking, while in the case that the ignition key switch IG·SW is shut-off when driving is over, this switch is opened so that the relay RL is prevented from being self-held any longer. Also, it is possible to design the arrangement such that the relay RL can forcibly be released from its self-holding status by opening the power switch SW even when the relay RL is under a self-holding status.

As fully explained hereinbefore, according to the present invention, there is provided the improved travel route indicating apparatus for use in an automotive vehicle, wherein a current location of the automotive vehicle in terms of the two-dimensional coordinates may be obtained arithmetically by means of the signal processing on the basis of the outputs from the travel distance detecting unit adapted to detect a current running distance of the vehicle and from the bearing detecting unit adapted to detect a resultant azimuth taken by the vehicle after travel to a current point, so that the thus obtained locational data on the location of the vehicle varying from time to time may be stored in sequence, and so that the travel path of the vehicle as it travels may be continuously visually indicated on the screen of the display from the thus-obtained travel data leading to the resulting current location of the vehicle, which comprises, in operative combination, the power supply control circuit adapted to detect the opening status of the ignition key switch and output a power conducting command for a predetermined period of time, and the power supply circuit adapted to self-hold the power conducting status to the signal processing unit upon the receipt of the command when the ignition key switch is opened, while holding the thus-stored data in the signal processing unit for a predetermined period of time even after the ignition key switch is opened, whereby there is attained such an advantageous feature that it is feasible in practice to immediately re-start the visual indication of the continued travel path of the vehicle upon the re-start thereof, without the necessity of updating such data for the visual indication on the display.

It is now clear that the objects set forth hereinbefore among those made apparent from the preceding description are efficiently attained, and because certain changes and modifications may be made in the foregoing teaching without departing from the spirit and scope of the invention, it is intended that all matter contained in the foregoing description or shown in the accompanying drawings shall be interpreted as illustrative and not in any way limiting.

It is also to be understood that the appended claims are intended to cover all of such generic and specific features particular to the invention as disclosed herein and all statements relating to the scope of the invention, which might be said to fall thereunder.

What is claimed is:

1. A travel route indicating apparatus for use in an automotive vehicle, wherein a current travel route of the automotive vehicle in terms of two-dimensional coordinates may be obtained arithmetically by means of signal processing means on the basis of the outputs from a travel distance detecting unit adapted to detect a current travel distance of the vehicle, and from a bearing detecting unit adapted to detect a resultant azimuth taken by the vehicle after the travel of the vehicle up to a current point of travel, so that the thus obtained locational data on the location of the vehicle varying from time to time may be stored in sequence, and so that the travel path of the vehicle may be continuously indicated, as the vehicle travels, on the screen of a display from the thus-obtained travel data leading to the resulting current location of the vehicle, which comprises, in operative combination:

power supply control circuit means for detecting the opening status of an ignition key switch and outputting a power conducting command for a predetermined period of time;

power supply circuit means for self-holding the power conducting status to said signal processing unit upon the receipt of said command when the ignition key switch is opened, while holding the thus-stored data in said signal processing unit for a predetermined period of time of from 5 to 10 minutes even after the ignition key switch is opened; and a power switch (SW) operatively cooperating with said power supply circuit means, said power switch being adapted to selectively forcibly release said power supply circuit means from the self-holding status thereof.

2. A travel route indicating apparatus according to claim 1, wherein there is further provided annunciator means for producing a warning upon the receipt of a short term warning signal from said supply power control circuit means when said ignition key switch is opened.

* * * * *